(12) United States Patent
Hummel

(10) Patent No.: US 7,304,793 B2
(45) Date of Patent: Dec. 4, 2007

(54) APPARATUS FOR EXAMINATION OF CHEMICAL AND/OR BIOLOGICAL SAMPLES

(75) Inventor: Stefan Hummel, Haseldorf (DE)

(73) Assignee: Evotec OAI AG, Hamburg (DE)

( * ) Notice: Subject to any disclaimer, the term of this patent is extended or adjusted under 35 U.S.C. 154(b) by 0 days.

(21) Appl. No.: 10/478,016

(22) PCT Filed: May 8, 2002

(86) PCT No.: PCT/EP02/05069

§ 371 (c)(1),
(2), (4) Date: Aug. 17, 2004

(87) PCT Pub. No.: WO02/093232

PCT Pub. Date: Nov. 21, 2002

(65) Prior Publication Data

US 2004/0263961 A1   Dec. 30, 2004

(30) Foreign Application Priority Data

May 11, 2001   (DE) ............... 101 23 027

(51) Int. Cl.
*G02B 21/06* (2006.01)
*G02B 3/00* (2006.01)
*G01J 3/30* (2006.01)

(52) U.S. Cl. ............... 359/390; 359/368; 359/655; 356/317

(58) Field of Classification Search ........ 359/368–398, 359/655–661, 808–810; 356/317–318, 244–246; 355/30
See application file for complete search history.

(56) References Cited

U.S. PATENT DOCUMENTS

| | | | |
|---|---|---|---|
| 3,202,049 A | 8/1965 | Bond | 359/660 |
| 3,648,587 A | 3/1972 | Stevens | 355/44 |
| 3,837,731 A | 9/1974 | Amos et al. | 355/656 |
| 5,677,525 A * | 10/1997 | Volcker et al. | 250/201.3 |
| 5,715,082 A | 2/1998 | Saccomanno et al. | 359/391 |
| 5,719,700 A * | 2/1998 | Corcuff et al. | 359/368 |
| 6,019,472 A * | 2/2000 | Koester et al. | 351/219 |
| 6,101,029 A | 8/2000 | Gaul et al. | 359/390 |
| 6,413,252 B1 * | 7/2002 | Zavislan | 606/22 |
| 6,755,817 B1 | 6/2004 | Donitzky et al. | 606/4 |

(Continued)

FOREIGN PATENT DOCUMENTS

DE   221563   9/1983

(Continued)

OTHER PUBLICATIONS

Webster's New Collegiate Dictionary, 1977, p. 207, G. & C. Merriam Co., USA.

*Primary Examiner*—Thong Q Nguyen
(74) *Attorney, Agent, or Firm*—Griffin & Szipl, P.C.

(57) ABSTRACT

An apparatus for examination of chemical and/or biological samples, comprises a sample support (14) for receiving the samples (16). Further, the apparatus comprises an objective (10) for observation of the sample (16) through a sample support wall (18). A gap (22) is formed between an outer surface (20) of the sample support wall (18) and an exit lens (12) of the objective (10). According to the invention, an automatic supply device (24) for automatic supply of immersion medium (46) is provided between the outer surface (20) of the sample support wall (18) and the exit lens (12) of the objective (10).

27 Claims, 2 Drawing Sheets

U.S. PATENT DOCUMENTS 6,809,794 B1 * 10/2004 Sewell .................. 355/30
6,867,844 B2 * 3/2005 Vogel et al. ............. 355/30
6,980,293 B1 * 12/2005 Harada .................. 356/317

FOREIGN PATENT DOCUMENTS

| GB | 1235587 | 6/1971 | |
| JP | 63-282654 A | | 11/1988 |
| JP | 4-340242 | * | 11/1992 |
| JP | 2005-62687 | * | 3/2005 |

* cited by examiner

APPARATUS FOR EXAMINATION OF CHEMICAL AND/OR BIOLOGICAL SAMPLES

FIELD OF THE INVENTION

This is a National Phase Application in the United States of International Patent Application No. PCT/EP02/05069 filed May 8, 2002, which claims priority on German Patent Application No. 10123027.3, filed May 11, 2001. The entire disclosures of the above patent applications are hereby incorporated by reference.

BACKGROUND OF THE INVENTION

The invention relates to an apparatus for examination of chemical and/or biological samples by means of optical devices. Such an apparatus can be provided e.g. as a microscope, particularly a confocal microscope.

Apparatus for examination of the above type comprise an objective for observation of the sample. When the objective is used, for instance, to observe a sample arranged in a sample support from below through a sample carrier bottom which is transmissive to the respective observation radiation, the given constellation of the refractive indices will have an unfavorable effect on the course of the path of rays, particularly in case of high numerical objectives. Varying refractive indices occur in the transition regions between the exit lens of the objective and the ambient air, as well as between the bottom of the sample support and the medium arranged between the objective and the sample carrier bottom.

Particularly in confocal microscopes which are used in high throughput screening, the focus has to be very small. This is required since, in high throughput screening, examination is performed on samples having low volumes in the µl range or below. Since the amount of the radiation emitted by the sample and taken in by the objective (collection efficiency) has a considerable influence on the measurement time, the aperture of the objective has to be as high as possible. This is of importance particularly in high throughput screening because the measurement time is one of the decisive parameters.

Normally, by use of a pipette or the like, the immersion liquid is applied manually to the exit lens of the objective with a refractive index >1. Particularly in high throughput screening systems and fully automated microscopes and the like, this is extremely cumbersome because the objective is arranged at a small distance to a sample support such as a titration plate. For applying the immersion liquid, the objective has to be retracted downwards so that the user can apply immersion liquid onto the exit lens by means of a pipette or the like. Subsequently, the objective is advanced to the sample support again until the gap between the exit lens of the objective and the outer surface of the sample support has been filled with the immersion medium. Alternatively, the objective can be stationary and the sample support can be moved.

A further disadvantage resides in that, when examining samples in titration plates, i.e. in sample supports comprising a plurality of individual samples, a relative movement will occur between the objective and the titration plate because the objective has to be advanced to each individual sample or vice is versa. In this relative movement, part of the immersion liquid will always remain on the underside of the sample support so that, after examination of several samples, the gap between the exit lens of the objective and the outer surface of the sample support may not be filled completely with immersion liquid anymore.

It is an object of the invention to facilitate the provision of immersion liquid in optical examination apparatus.

SUMMARY OF THE INVENTION

According to the invention, the above object is achieved by an apparatus according to a first embodiment of the invention and a method according to a second embodiment of the intention, respectively. The apparatus, in accordance with the first embodiment, is for examination of chemical and/or biological samples, including: a sample support (14) for receiving the samples (16); an objective (10) for observation of the samples (16) through a sample support wall (18), wherein a gap (22) is formed between an outer surface (20) of the sample support wall (18) and an exit lens (12) of the objective (10); and a supply device (24) for automatic supply of an immersion medium (46) between the outer surface (20) of the sample support wall (18) and the exit lens (12) of the objective (10). The method, in accordance with the second embodiment, is for examination of chemical and/or biological samples, including the steps of: (a) arranging a sample support (14) receiving the sample (16) relative to an objective (10) in such a manner that a gap (22) is formed between an outer surface (20) of a sample support wall (18) and an exit lens (12) of the objective (10), and (b) subsequent automatic supply of immersion medium (46) into the gap (22).

According to the invention, the proposed apparatus for examination of chemical and/or biological samples is provided with a supply device for automatic supply of immersion medium. By means of the supply device, immersion medium can be automatically supplied between a sample support serving for receiving the samples, and an exit lens of an objective provided for observation of the samples. Thus, during the observation of a sample, the gap between the exit lens and the objective can always be filled with immersion medium. Instead of a sample support, a means for receiving or holding the sample support can be provided. In the given case, the immersion medium will then not touch the sample support itself but a plate of the holder or the like.

Since, according to the invention, the supply of the immersion medium by means of the supply device is carried out automatically, no user intervention is required in the apparatus, particularly in the high throughput screening system or another automatic device. Instead, the supply device can be configured to the effect that also a retracting of the objective, i.e. a removal of the objective from the outer surface of a sample support wall of the sample support or a movement of the sample support will not be required. The inventive apparatus makes it possible to supply an immersion medium in the measurement position of the objective, i.e. in that position in which the objective is arranged also during the examination of the sample.

The inventive supply of immersion medium is preferably performed in that a thin film of immersion medium is formed between the objective and the outer surface of the sample support wall. It is particularly preferred that the width of the gap is selected, in dependence on the immersion medium used, in such a manner that the immersion medium is caused to enter the gap under the effect of capillary forces.

For this purpose, the supply device preferably comprises a supply tube connected to the objective. In this embodiment, the supply tube is held by the objective so that an exit opening of the supply tube will always maintain a defined position relative to the exit lens of the objective. Preferably, the supply tube is arranged in a manner allowing for the realization of a rigid connection of the supply tube with the objective. The exit opening of the supply tube is thus arranged outside the relevant path of rays for the measurement so that the supply tube does not cast shadows.

The exit opening of the supply tube is arranged as close as possible to the exit lens. Preferably, the distance is smaller than 15 mm, particularly smaller than 10 mm, and even more preferably, smaller than 7 mm from the exit lens.

It is preferred that the cross sectional area of the exit opening, which preferably is flattened, is smaller than 1 mm$^2$, particularly smaller than 0.8 mm$^2$.

To guarantee a most uniform and bubble-free application of the immersion medium onto the exit lens of the objective, the exit opening of the supply tube is preferably arranged at a displacement relative to a central point of the exit lens in the direction of the objective. In a configuration where the objective is oriented upwards, this means that the exit opening of the supply tube is located below a maximal point of the exit lens. Thereby, it is further safeguarded that the supply tube does not touch the sample support.

For conveying the immersion medium, the supply device comprises a pump, for instance. The preferably controllable pump will preferably be a controllable hose pump arranged to act on a hose connected to the supply tube. The provision of a hose pump offers the advantage that no parts of the pump, particularly no metallic parts, will get into contact with the immersion medium so that the immersion medium will not be affected by the pump.

A further possibility for the supply of the immersion medium resides in the provision of a supply container which is connected to the supply tube via a fluid element such as a hose. Relative to the exit opening, the supply container is arranged on a higher level, causing the immersion medium to flow in the direction of the exit opening under the effect of gravity. For control of the exiting quantity and of the frequency of the immersion exit, a preferably controllable valve can be provided in the fluid element.

By use of a pump or a supply container which optionally can also be connected to a pump, it is possible to supply immersion medium e.g. at fixedly predetermined points of time. Further, a continuous supply of immersion medium is possible.

In a preferred embodiment, a lens head of the objective is surrounded by a take-up means provided to receive excess immersion medium. Such a take-up means is advantageous particularly in case of a continuous supply of immersion medium. When the supply of immersion medium is performed continuously or at predetermined time intervals, it is primarily due to the small gap between the exit lens of the objective and the outer surface of the sample support wall that the immersion medium film provided between the exit lens of the objective and the outer surface of the sample support will not tear apart.

The take-up means is preferably provided as a take-up trough preferably surrounding the whole lens head. This trough can have its inner edge provided with a sealing lip or the like so that the take-up trough can be placed around conventional lens heads.

For performing sequences of examinations—particularly long sequences—in high throughput screening systems, the take-up means comprises a drain opening provided to discharge liquid immersion medium from the take-up means. Via the drain opening, the immersion medium can flow off, for instance. Preferably, the drain opening is provided with a suction means for suctional removal of excess immersion medium.

The gap provided between the exit lens of the objective and the outer surface of the sample support wall has a sizes in case of high throughput screening methods, of less than 1000 µm, preferably less than 500 µm and still more preferably less than 200 µm. With such a small gap width, a tearing-apart of the immersion medium in case of continuous supply of immersion medium is avoided. Further, the medium will not tear as a result of a relative movement between the objective and the sample support, provided that the supply of a sufficient quantity of immersion medium will be continued. Because of the capillary forces occurring in such a small gap, it is also possible to arrange the above described apparatus with the objective facing downwards.

The above disclosed apparatus is particularly suited for use in confocal microscopes.

The invention further relates to a method for examination of chemical and/or biological samples which here will particularly be an optical examination method. According to the inventive method, a sample support receiving a sample is arranged in place relative to an objective. The arrangement is performed in such a manner that a gap is formed between the outer surface of a sample support wall and an exit lens of the objective. If the objective is arranged below the sample support, the gap will thus extend between an underside of a sample support bottom and the exit lens. Afterwards, the immersion medium is automatically introduced into the gap. This automatic supply makes the inventive method particularly suited for continuous examination methods. Especially in high throughput screening methods wherein a large number of samples have to be measured at short time intervals, the inventive method will save considerable time and will yield examination results of a considerably improved quality.

Preferably, the immersion medium is introduced into the gap using a controllable supply device. The supply of the immersion medium can be performed continuously, at regular intervals or exclusively as needed in the given instance.

The refractive index of the immersion medium is preferably >1, particularly >1.3 to thus reach a numerical aperture of the objective of >1. This allows for the realization of an extremely small focus as required for a high resolution.

As an immersion medium, preferred use is made of water or oil.

The inventive method preferably includes a further step wherein excess immersion medium is discharged.

Further, it is advantageous to introduce a cleansing liquid into the gap prior to the supply of the immersion medium. In this manner, the outer lens of the objective and the sample carrier bottom can be cleaned. As a cleansing liquid, e.g. alcohol can be used. Further, the possibility exists to use different immersion media and, prior to introduction of a new immersion medium, to clean the exit lens of the objective as well as the outer surface of the sample support wall by supplying a cleansing liquid. To accelerate such a process, it is possible to provide a plurality of supply devices, wherein, for instance, one supply device is used for supplying a first immersion medium, a second supply device is used for supplying a cleansing liquid, and third supply device is used for supplying a second immersion medium.

Further, a feedback can be provided between the quantities of immersion medium which are supplied to the exit lens and those which are discharged. Thereby, the quantity of the required immersion medium can be monitored. For control of the quantity of immersion medium supplied to the exit lens and the quantity of immersion medium discharged, a valve can be provided in the infeed line and/or the discharge line.

BRIEF DESCRIPTION OF THE DRAWINGS

A preferred embodiment of the invention will be explained in greater detail hereunder with reference to the accompanying drawings.

DETAILED DESCRIPTION OF THE INVENTION

Figure 1:
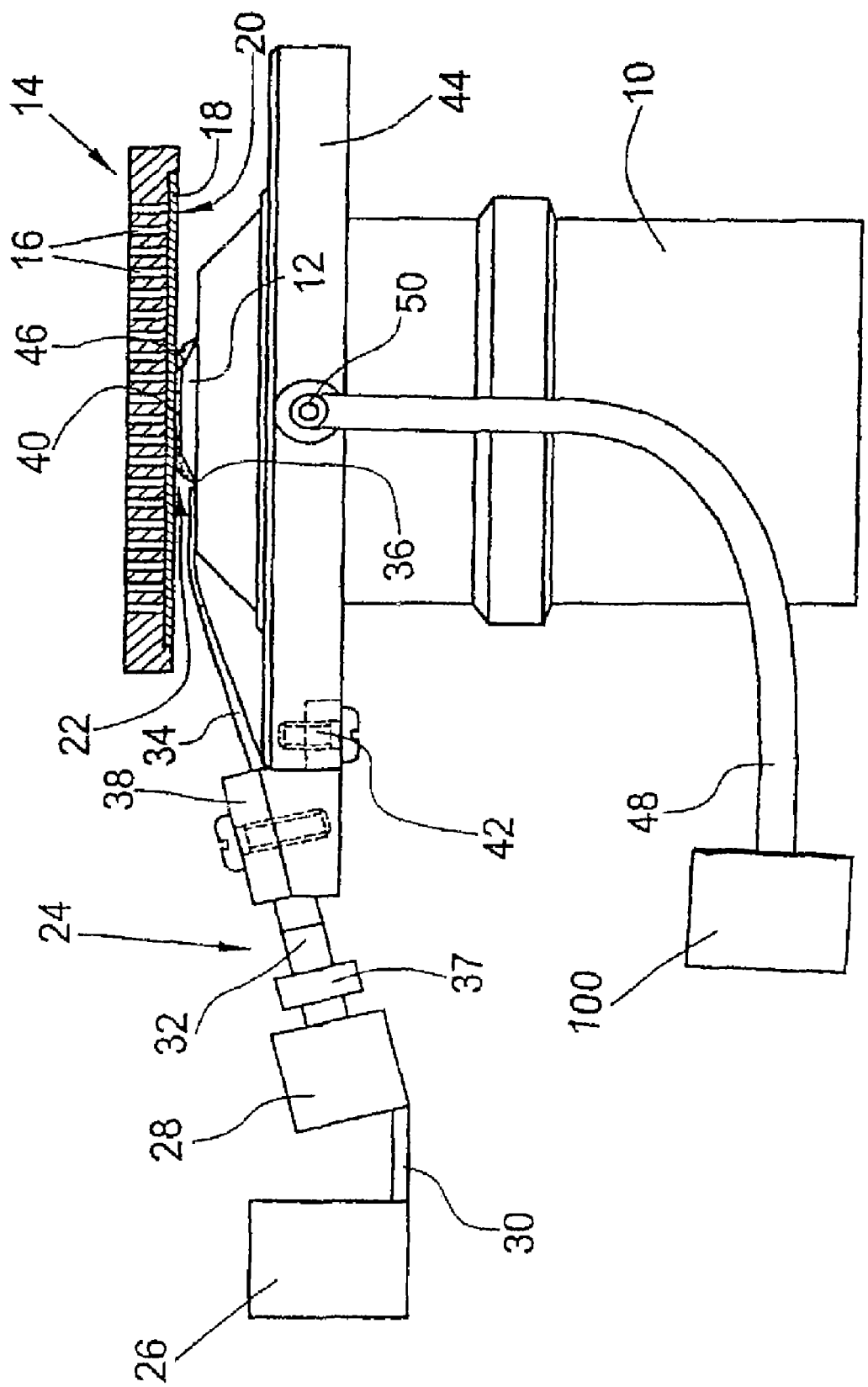
FIG. 1 shows a schematic side view of the apparatus of the invention.
Figure 2:
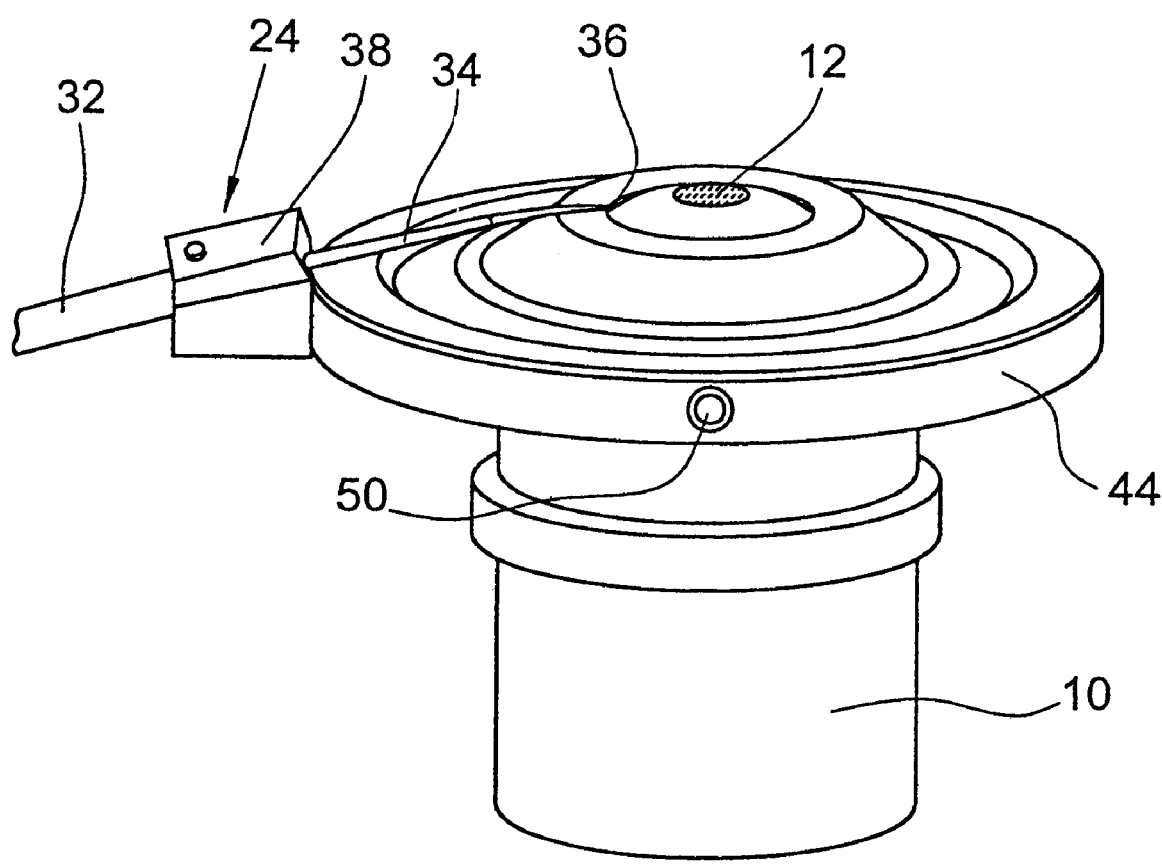
FIG. 2 shows a schematic perspective view of the apparatus according to FIG. 1.

In the illustrated embodiment, the apparatus of the invention comprises an objective 10 with an exit lens 12 extending vertically upwards. Arranged opposite the exit lens 12 is a sample support 14 designed to receive a plurality of samples 16. The underside of sample support 14 is closed by a transparent sample support wall 18 which in the illustrated embodiment is the sample support wall. By means of the objective 10, examinations are performed on the individual samples 16.

The exit lens 12 of objective 10 which, for instance, can also be a protective glass cover or an auxiliary lens, is arranged at a distance from an outer surface of sample support 14. Thereby, a gap 22 is formed between the exit lens 12 and the outer surface 20 of the sample support wall 18.

By means of a supply device 24, immersion medium provided in a reservoir 26 is introduced into the gap 22. For this purpose, the supply device comprises a pump 28 connected to reservoir 26 via a hose 30. Connected to the pump 28 is a hose or tube 32 leading to a supply tube 34. The end of supply tube 34 is formed similar to the tip of a pipette and has a flattened exit opening 36. To prevent the liquid column from dropping, a valve 37 is provided.

For setting the distance of the exit opening 36 of supply tube 34 relative to the exit lens 12, the tube 32 is held in a clamping means 38 allowing the tube to be displaced in a longitudinal direction. Thus, the clamping means can be used for setting the position of exit opening 36 relative to exit lens 12. To this effect, for instance, the clamping means 38 can also be arranged to be tilted about an axis extending vertically to the plane of the drawing. In the illustrated embodiment, the exit opening 36 of supply tube 34 is arranged below the maximal point 40 of exit lens 12. Thus, exit opening 36 is arranged at a displacement relative to the maximal point 40 of exit lens 12 in the direction of objective 10.

The clamping means 38 is held by means of a bolt 42 to a collar-shaped take-up means 44 surrounding the objective 10. Bolt 42 can be used for further adjustment of clamping means 38 and thus of exit opening 36 of supply tube 34. Take-up means 44 serves for taking up immersion medium 46 provided between exit lens 12 and sample support 14 if excess immersion medium is supplied via-supply device 24 to gap 22 or if the supplying is performed continuously.

The collar-shaped take-up means 44 comprises a discharge opening 50 connected to a hose 48. Further, the hose 48 can have a device 100 for suctional removal connected thereto.

The invention claimed is:

1. An apparatus for examination of chemical and/or biological samples, comprising:
   a sample support for receiving samples;
   an objective for observation of the samples through a sample support wall, wherein a gap is formed between an outer surface of the sample support wall and an exit lens of the objective; and
   a controllable supply device for automatic supply of an immersion medium between the outer surface of the sample support wall and the exit lens of the objective, characterized in that a lens head of the objective is surrounded by a take-up means for taking up excess immersion medium supplied to the gap.

2. The apparatus according to claim 1, characterized in that the supply device comprises a supply tube connected to the objective.

3. The apparatus according to claim 2, characterized in that an exit opening of the supply is arranged at a distance of less than 15 mm from the exit lens.

4. The apparatus according to claim 3, characterized in that the cross section of the exit opening is less than 1 $mm^2$.

5. The apparatus according to claim 3, characterized in that the exit opening is arranged at a displacement relative to a maximal point of the exit lens in the direction of the objective.

6. The apparatus according to claim 5, characterized in that, for supply of the immersion medium, a supply container is provided which is arranged at a different level relative to the exit opening.

7. The apparatus according to claim 5, characterized in that a controllable hose pump is provided for supply of the immersion medium.

8. The apparatus according to claim 3, characterized in that the exit opening is arranged at a distance of less than 7 mm from the exit lens.

9. The apparatus according to claim 3, characterized in that the cross section of the exit opening is less than 0.8 $mm^2$.

10. The apparatus according to claim 2, characterized in that the supply tube has a controllable valve connected thereto.

11. The apparatus according to claim 1, characterized in that the take-up means is formed as a take-up trough.

12. The apparatus according to claim 1, characterized in that the take-up means comprises a drain opening.

13. The apparatus according to claim 12, characterized in that the drain opening is connected to a means for suctional removal.

14. The apparatus according to claim 1, characterized in that the gap has a width of less than 1000 µm.

15. Use of the apparatus according to claim 1 in a confocal microscope.

16. The apparatus according to claim 1, characterized in that the gap has a width of less than 500 µm.

17. The apparatus according to claim 1, characterized in that the gap has a width of less than 200 µm.

18. The apparatus according to claim 1, wherein the take-up means is collar-shaped.

19. The apparatus according to claim 1, wherein the objective is an objective of a confocal microscope.

20. The apparatus according to claim 1, wherein the controllable supply device is controllable to supply immersion medium continuously or at fixedly predetermined points of time.

21. A method for examination of chemical and/or biological samples, comprising the steps of:
   arranging a sample support receiving a sample relative to an objective in such a manner that a gap is formed between an outer surface of a sample support wall and an exit lens of the objective; and subsequent automatic supply, performed continuously or at fixedly predetermined points of time, of immersion medium into the gap; and discharging excess immersion medium supplied to the gap using a take-up means for taking up excess immersion medium supplied to the gap, wherein a lens head of the objective is surrounded by the take-up means.

22. The method according to claim 21, wherein supply of the immersion medium is performed through a controllable supply device.

23. The method according to claim 21, wherein the immersion medium has a refractive index >1.

24. The method according to claim 21, wherein, prior to the supply of the immersion medium, a cleansing liquid is supplied for cleaning the exit lens of the objective.

25. The method according to claim 21, wherein the immersion medium has a refractive index >1.3.

26. The method according to claim 21, wherein the take-up means is collar-shaped.

27. The method according to claim 21, wherein the objective is an objective of a confocal microscope.

* * * * *